United States Patent
Clifford et al.

(10) Patent No.: US 11,416,180 B2
(45) Date of Patent: Aug. 16, 2022

(54) TEMPORARY DATA STORAGE IN DATA NODE OF DISTRIBUTED FILE SYSTEM

(71) Applicant: International Business Machines Corporation, Armonk, NY (US)

(72) Inventors: Austin Clifford, Glenageary (IE); Mara Matias, Dublin (IE); Ilker Ender, Dublin (IE)

(73) Assignee: International Business Machines Corporation, Armonk, NY (US)

(*) Notice: Subject to any disclaimer, the term of this patent is extended or adjusted under 35 U.S.C. 154(b) by 40 days.

(21) Appl. No.: 17/090,002

(22) Filed: Nov. 5, 2020

(65) Prior Publication Data

US 2022/0137884 A1 May 5, 2022

(51) Int. Cl.
*G06F 3/06* (2006.01)
*G06F 16/188* (2019.01)
*G06F 16/182* (2019.01)

(52) U.S. Cl.
CPC .......... *G06F 3/0664* (2013.01); *G06F 3/0604* (2013.01); *G06F 3/0689* (2013.01); *G06F 16/182* (2019.01); *G06F 16/188* (2019.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126;
(Continued)

(56) References Cited

U.S. PATENT DOCUMENTS 8,522,125 B1 * 8/2013 Feng ................. H03M 13/2921
 714/801
8,635,429 B1 * 1/2014 Naftel ................. G06F 11/1469
 711/206
(Continued)

FOREIGN PATENT DOCUMENTS

WO 2015161140 A1 10/2015

OTHER PUBLICATIONS

IBM Platform Computing Solutions for High Performance and Technical Computing Workloads; Quintero et al.; IBM; Jun. 2015 (Year: 2015).*

(Continued)

*Primary Examiner* — Daniel C. Chappell
(74) *Attorney, Agent, or Firm* — Stephanie L. Carusillo

(57) ABSTRACT

Proposed are concepts for providing resilience (i.e., fault tolerance) for the temporary data needs of a distributed file system. Such concepts may, for instance, provide a virtual storage layer in a data node of a distributed file system. The virtual storage layer may provide resilience for the temporary data needs of a Massively Parallel Processing (MPP) SQL on Hadoop engine.

14 Claims, 6 Drawing Sheets

(58) Field of Classification Search
CPC ......... G06N 5/00–048; G06N 7/00–08; G06N 10/00; G06N 20/00–20; G06N 99/00–007; G11B 20/00–24; G11B 33/00–1493; G11C 7/00–24; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H04L 9/00–38; H04L 12/00–66; H04L 41/00–5096; H04L 49/00–9094; H04L 61/00–6095; H04L 67/00–42

See application file for complete search history.

(56) References Cited

U.S. PATENT DOCUMENTS

| | | | |
|---|---|---|---|
| 9,378,093 B2* | 6/2016 | Cooper | G06F 11/1092 |
| 9,542,272 B2* | 1/2017 | Krishnamurthy | G06F 3/064 |
| 9,817,840 B1 | 11/2017 | Emelyanov | |
| 10,241,709 B2 | 3/2019 | Scales | |
| 10,379,956 B2 | 8/2019 | Gandhi | |
| 10,929,040 B1* | 2/2021 | Trachtman | G06F 3/065 |
| 2013/0144866 A1 | 6/2013 | Jerzak | |
| 2014/0032593 A1* | 1/2014 | Libenzi | G06F 16/245 707/769 |
| 2015/0242139 A1* | 8/2015 | Moore | G06F 3/0659 711/114 |
| 2016/0117129 A1* | 4/2016 | Shrader | G06F 13/16 711/105 |
| 2016/0267132 A1 | 9/2016 | Castellanos | |
| 2017/0344285 A1* | 11/2017 | Choi | G06F 3/0631 |
| 2017/0345462 A1* | 11/2017 | Chhuor | G06F 1/187 |
| 2018/0103103 A1* | 4/2018 | Dhuse | H03M 13/3761 |
| 2018/0341662 A1* | 11/2018 | He | H04L 61/5007 |
| 2019/0042424 A1 | 2/2019 | Nair | |
| 2020/0004650 A1* | 1/2020 | Hanko | G06F 3/0689 |
| 2020/0012523 A1 | 1/2020 | Kumar | |
| 2020/0125383 A1* | 4/2020 | Viswanathan | G06F 9/45558 |
| 2022/0137884 A1* | 5/2022 | Clifford | G06F 16/182 711/114 |

OTHER PUBLICATIONS

Implementing the IBM Storwize V7000 Gen2; Tate et al.; IBM; Jan. 2015 (Year: 2015).*

A. Chiniah and A. Mungur, "Dynamic Erasure Coding Policy Allocation (DECPA) in Hadoop 3.0," 2019 6th IEEE International Conference on Cyber Security and Cloud Computing (CSCloud)/ 2019 5th IEEE International Conference on Edge Computing and Scalable Cloud (EdgeCom), 2019, pp. 29-33 (Year: 2019).*

Y. Chen, Y. Zhou, S. Taneja, X. Qin and J. Huang, "aHDFS: An Erasure-Coded Data Archival System for Hadoop Clusters," in IEEE Transactions on Parallel and Distributed Systems, vol. 28, No. 11, pp. 3060-3073, Nov. 1, 2017, doi: 10.1109/TPDS.2017. 2706686. (Year: 2017).*

P. Subedi, Ping Huang, Benjamin Young and Xubin He, "FINGER: A novel erasure coding scheme using fine granularity blocks to improve Hadoop write and update performance," 2015 IEEE International Conference on Networking, Architecture and Storage (NAS), 2015, pp. 255-264, doi: 10.1109/NAS.2015.7255194. (Year: 2015).*

T. Jones, B. Sarnowska, F. Lovato, D. Magee and J. Kothe, "Architecture, Implementation, and Deployment of a High Performance, High Capacity Resilient Mass Storage Server (RMSS)," 2001 Eighteenth IEEE Symposium on Mass Storage Systems and Technologies, 2001, pp. 41-41, doi: 10.1109/MSS.2001.10014. (Year: 2001).*

Anonymous et al., "Managing Disk Space for Impala Data", Cloudera, Inc., Oct. 5, 2020, 4 Pages.

IBM, "Workload Management—IBM Db2 Big SQL 6.0.0", IBM Knowledge Center, Accessed on Oct. 12, 2020, 2 Pages.

Klein, Andy, "Hard Drive Stats for Q1 2017", Backblaze, May 9, 2017, 6 Pages.

Wikipedia, "Chiron FS", Wikipedia, Accessed on Oct. 12, 2020, 1 Page.

Wikipedia, "mdadm", Wikipedia, Accessed on Oct. 12, 2020, 5 Pages.

* cited by examiner

TEMPORARY DATA STORAGE IN DATA NODE OF DISTRIBUTED FILE SYSTEM

BACKGROUND

The present invention relates to distributed file systems, and more particularly, to facilitating resilient temporary data storage in a data node of a distributed file system, such as a Hadoop Distributed File System.

Data can be stored in relational tables of a relational database management system (RDBMS). A database query, such as a Structured Query Language (SQL) query, can be submitted to an RDBMS to access (read or write) data contained in relational table(s) stored in the RDBMS.

As the amount of data that is generated has become increasingly large, different distributed data storage architectures have been proposed or implemented for storing large amounts of data in a computationally less intensive manner. An example of such a distributed storage architecture for storing large amounts of data (also referred to as "big data") is the Hadoop framework used for storing big data across a distributed arrangement of storage nodes (hereinafter referred to as 'data nodes').

A Hadoop Distributed File System (HDFS) is a distributed file system designed to run on commodity hardware. It has many similarities with existing distributed file systems. However, the differences from other distributed file systems are significant. HDFS is highly fault-tolerant and is designed to be deployed on low-cost hardware. HDFS provides high throughput access to application data and is suitable for applications that have large data sets. Massively Parallel Processing (MPP) SQL-on-Hadoop engines allow enterprises to run complex SQL workloads on big data residing on a HDFS.

Where memory-intensive data operations (such as Join and Sort operation) cannot be contained in physical memory, these operations are spilled over into temporary tablespace on local disk storage. A tablespace is a logical set of volumes on disks that hold the data sets in which tables are actually stored. Tablespaces can be both permanent (for long term retention of data), or temporary (for transient needs, such as spilling of memory overflows on to disk). The temporary tablespaces are placed on the same disks on which the HDFS filesystem resides. HDFS is fault tolerant and this is achieved through software replication with (by default) three replicas of each HDFS data block placed on three separate data nodes in a cluster. Node and disk failures are catered for by resorting to one of the replica data blocks. HDFS is not a Portable Operating System Interface (POSIX)-compliant filesystem, as it trades off some POSIX requirements for resilience and performance. The temporary tablespaces, however, require a POSIX filesystem and therefore cannot be placed on HDFS.

Because the Just a Bunch of Disks (JBOD) disks local to each data node host are each formatted simply as a single partition devoted to a single filesystem, raw disk devices are not available to SQL-on-Hadoop engines. Therefore, the SQL engine temporary tablespaces are simply striped as regular files across the available filesystems.

If any of the underlying JBOD disks fail, then the tablespace becomes unusable and is marked offline. If workload queries are executing at the time the disk fails, then all of these queries will abort and fail. The overall frequency of disk failures is directly related to the size of the cluster. On even relatively modest scale Hadoop clusters comprising thirty nodes, with a typical configuration of twelve to fifteen disks per data node, there can be in excess of four hundred disk drives. Based on typical Annual Failure Rates (AFR) observed for conventional disk drives that are commonly deployed in HDFSs, this translates to around one disk failure per month on even this modest-scale cluster. On larger deployments of three hundred (or more) physical data nodes, the typical AFR translates to a disk failure every other day.

SUMMARY

The present invention seeks to provide a method for providing virtual storage for temporary data storage in a data node of a distributed file system that may provide improved resilience. Such a method may be computer-implemented. The present invention further seeks to provide a computer program product including computer program code for implementing the proposed concepts when executed on a processor. The present invention further seeks to provide a data node of a distributed file system.

According to an embodiment of the present invention there is provided a computer-implemented method for providing virtual storage for temporary data storage in a data node of a distributed file system, the data node comprising a plurality of formatted disk drives. The method comprises, for each of the plurality of formatted disk drives of the data node, defining a sparse file of a predetermined size and configuring the sparse file as a virtual disk drive. The method also comprises configuring the virtual disk drives as a Redundant Array of Independent Disks (RAID) array, and then provisioning a virtual file system over the RAID array for storing temporary data of the data node.

According to another aspect of the invention, there is provided a computer-implemented method for a distributed file system comprising a plurality of data nodes each comprising a respective plurality of formatted disk drives. The method comprises, for each of the plurality of data nodes, providing virtual storage for temporary data storage in the data node according to a proposed embodiment.

Embodiments may be employed in combination with conventional/existing distributed file systems, such as HDFS for example. In this way, embodiments may integrate into legacy systems so as to improve and/or extend their functionality and capabilities. An improved distributed file system may therefore be provided by proposed embodiments.

According to another embodiment of the present invention, there is provided a computer program product for providing virtual storage for temporary data storage in a data node of a distributed file system, the data node comprising a plurality of formatted disk drives, the computer program product comprising a computer readable storage medium having program instructions embodied therewith, the program instructions executable by a processing unit to cause the processing unit to perform a method according to one or more proposed embodiments when executed on at least one processor of a data processing system.

According to another embodiment of the present invention, there is provided a computer program product for controlling a distributed file system comprising a plurality of data nodes each comprising a respective plurality of formatted disk drives, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system comprising at least one processor and the computer program product according to one or more embodiments, wherein the at least one processor is adapted to execute the computer program code of said computer program product.

According to another aspect, there is provided a data node of a distributed file system, the data node comprising a plurality of formatted disk drives. Each of the plurality of formatted disk drives of the data node comprises a sparse file of a predetermined size configured as a virtual disk drive. Also, the virtual disk drives are configured as a RAID array, and a virtual file system is provisioned over the RAID array for storing temporary data of the data node.

Thus, there may be proposed a concept for providing a lightweight fault tolerant virtual storage layer in a data node of a distributed file system. For instance, such a concept may provide a lightweight mechanism to provide resilience for the temporary tablespaces without requiring a complex POSIX-compliant distributed file system or wholesale re-provisioning of the existing disk storage.

BRIEF DESCRIPTION OF THE DRAWINGS

Preferred embodiments of the present invention will now be described, by way of example only, with reference to the following drawings, in which.

DETAILED DESCRIPTION

Figure 1:
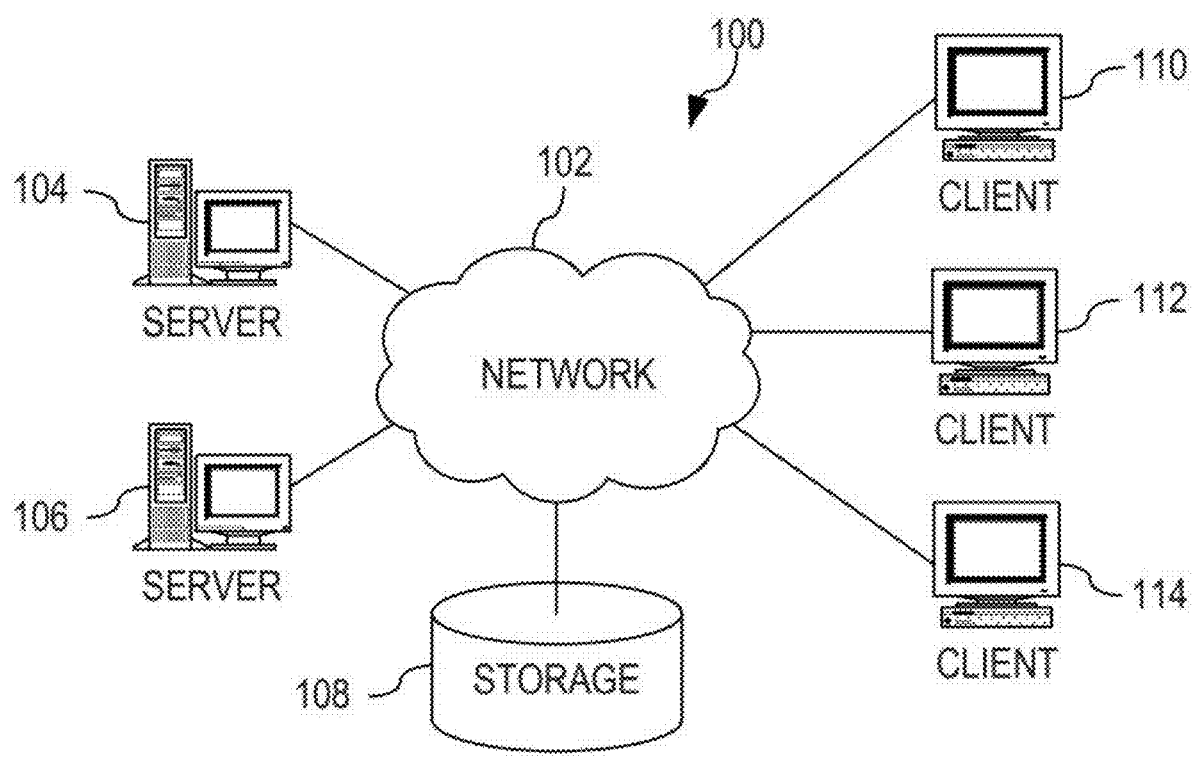
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present invention, where embodiments of the present invention constitute a method, it should be understood that such a method is a process for execution by a computer, i.e., a computer-implementable method. The various steps of the method therefore reflect various parts of a computer program, e.g., various parts of one or more algorithms.

Also, in the context of the present invention, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Also, in the context of the present invention, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet, and so on to cooperatively execute at least one embodiment of the methods of the present invention.

Proposed are concepts for providing resilience (i.e., fault tolerance) for the temporary data needs of a distributed file system. Such concepts may, for instance, provide a virtual storage layer in a data node of a distributed file system. The virtual storage layer may provide resilience for the temporary data needs of a Massively Parallel Processing (MPP) SQL on Hadoop engine. Further, the virtual storage layer may not require a complex POSIX-compliant distributed file system.

By way of example, some embodiments may leverage existing software-managed storage utilities along with the conventional tools for configuring sparse files as virtual disk drive, so as to provide a RAID array over a plurality of virtual disk drives. Such a RAID array may then be used to provide virtual storage for temporary data (such as a temporary tablespace) of a distributed file system. An exemplary process for implementing this in a data node of a HDFS may be summarised as follows:

(i) A set of sparse files of fixed size, one on each of the available ext3/ext4 formatted file systems is created;

(ii) The sparse files are then each presented as virtual disks (e.g. using the LINUX® loop device feature—a loop device is a pseudo-device that makes a file accessible as a block device);

(iii) A RAID array is then created across the virtual disks (e.g. using the LINUX® mdadm utility) and formatted as an XFS filesystem; and (iv) A new, fault tolerant temporary tablespace is then created using the XFS filesystems.

As a result of provisioning such virtual storage for a temporary tablespace of a distributed file system, a workload management component/utility may be used to monitor the usage of the tablespace(s). Based the monitored usage, allocation and/or management of queries may be implemented. For example, excessive consumers may be directed/diverted to a conventional fault intolerant (but elastic) tablespace. Also, monitoring information may be used to modify the size of a (fault tolerant) tablespace of the virtual storage.

The ability to provide fault-resilient temporary tablespaces on an existing disk cluster without any additional hardware or complex distributed file system software may be particularly advantageous, e.g., for existing and future HDFS deployments.

By way of example, according to an exemplary embodiment, there may be provided a computer-implemented method for providing virtual storage for temporary data storage in a data node of a distributed file system, wherein the data node comprises a plurality of formatted disk drives. Such a method comprises, for each of the plurality of formatted disk drives of the data node, defining a sparse file of a predetermined size and configuring the sparse file as a virtual disk drive. The virtual disk drives are then configured as a RAID array, and a virtual file system is provisioned over the RAID array for storing temporary data of the data node.

The predetermined size of the sparse files may be a fixed value, and thus the sparse files may be of the same size for each of the plurality of disk drives of the data node.

The distributed file system may, for example, comprise a HDFS. Thus, in such embodiments, the temporary data of the data node may comprise a temporary tablespace.

Configuring the sparse file as a virtual disk drive may comprise exposing the sparse file as a loop device. This may be achieved using a conventional approach, such as by exposing a sparse file as a LINUX® loop device. Further, configuring the virtual disk drives as a RAID array may employ a conventional software-managed storage utility, such as the LINUX® mdadm utility. Proposed embodiments may therefore leverage the capabilities of existing/conventional GNU/LINUX® distributions, thereby reducing the cost and/or complexity.

Proposed embodiments for providing virtual storage for temporary data storage in the data node may be implemented for each data node of a distributed file system. In this way, a distributed file system may be provided with virtual storage for temporary data storage. The data nodes of such a distributed file system may also be provided with conventional temporary storage space that is striped across the plurality of disk drives of the data node. That is, for distributed file systems that cater to more than one system temporary tablespace, embodiments of the present invention propose to allocate a portion of each disk for resilient temporary tablespace (i.e., virtual storage for temporary data storage according to an embodiment) whilst also retaining the existing/conventional non-resilient temporary tablespace. Using a workload manager, queries may be allocated to either the conventional temporary storage space or the proposed virtual temporary storage space. Such management of query allocation may, for example, be controlled according to various factors, such as performance requirements, data storage availability, query criticality, etc.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted embodiment, first server 104 and second server 106 are connected to the network 102 along with a storage unit 108. In addition, clients 110, 112, and 114 are also connected to the network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted embodiment, the distributed system 100 is connected to the Internet with the network 102 representing a worldwide collection of networks and gateways that use the Transmission Control Protocol/Internet Protocol (TCP/IP) suite of protocols to communicate with one another. The distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
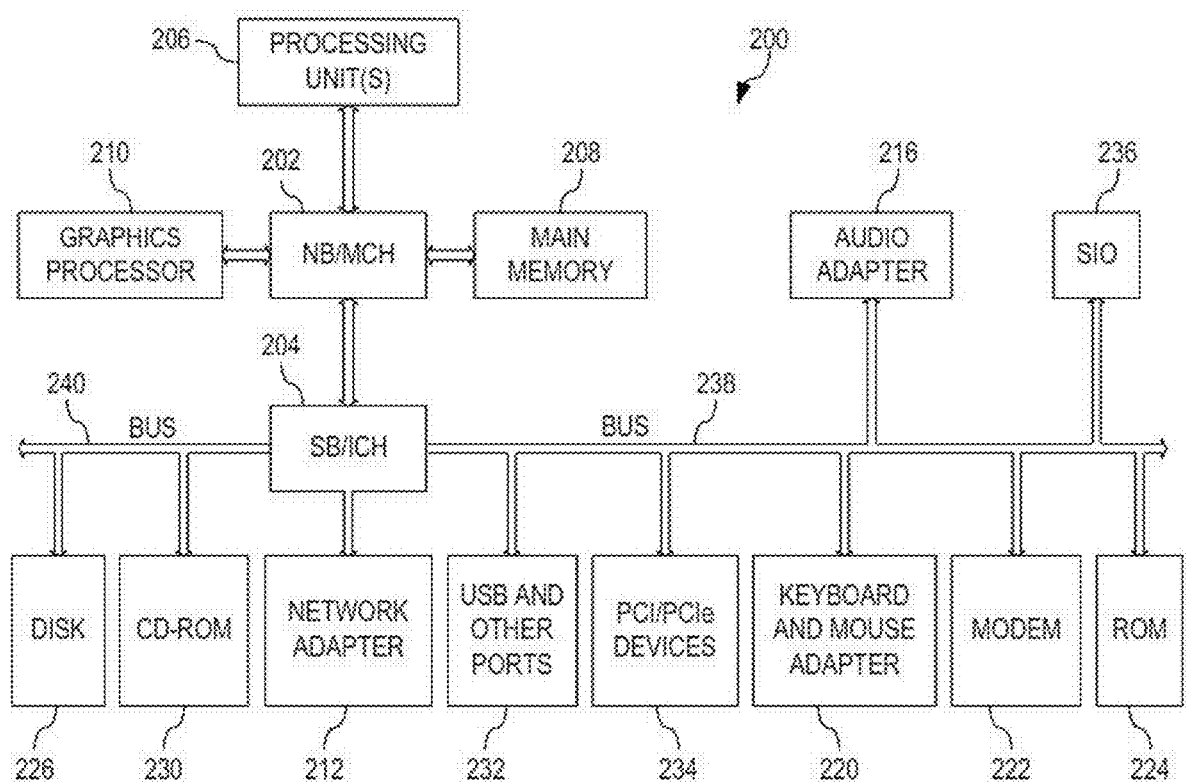
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 of FIG. 1, in which computer usable code or instructions implementing the processes for illustrative embodiments of the present invention may be located. For instance, a proposed embodiment may be partly implemented in a processing unit 206 of the system 200.

In the depicted example, the system 200 employs a hub architecture including a north bridge and memory controller hub (NB/MCH) 202 and a south bridge and input/output (I/O) controller hub (SB/ICH) 204. Thus, another proposed embodiment may be implemented in the memory controller hub 202 of the system 200. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the JAVA™ programming system, may run in conjunction with the operating system and provides calls to the operating system from JAVA™ programs or applications executing on system 200.

As a server, system 200 may be, for example, an IBM® eServer™ System p5® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
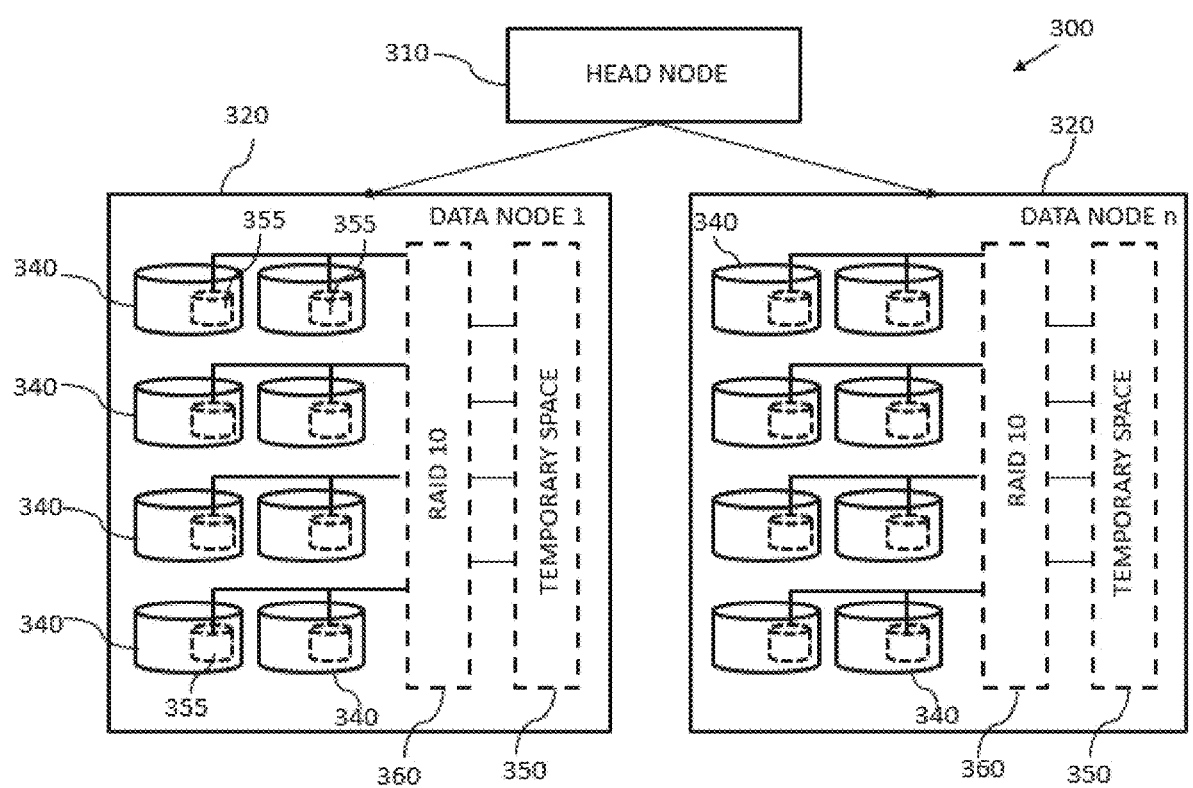
FIG. 3 depicts a simplified block diagram of a distributed file system, in accordance with an embodiment of the present invention.

FIG. 3 depicts a simplified block diagram of a distributed file system 300, in accordance with an embodiment of the invention. The distributed file system comprises a head node 310 and a plurality of data nodes 320. Each data node 320 comprises a plurality of formatted disk drives 340 and the newly proposed (resilient) virtual tablespace 350.

In this example (which comprises on-premise Hadoop clusters), there is a plurality of n data nodes 320, in which n can represent any number of data nodes. Each data node 320 hosts eight formatted disk drives 340, wherein each entire disk drive 340 is formatted with a single ext4 filesystem. Each ext4 filesystem is mounted and used for storing HDFS data local to each data node 320.

A sparse file 355 of a predetermined size is created on each ext4 filesystem and these are presented as loop devices 355. A RAID10 array 360 is created over these loop devices 355, and this is formatted and made available on which to create a resilient temporary tablespace 350. With this configuration, if a disk failure occurs, there is no impact on any in-flight queries.

The multiple disk administration (mdadm) utility provides a command line interface to create the software managed redundant arrays. These are normally raw devices created as partition on a disk drive, e.g., /dev/sda, /dev/sdb, /dev/sdc. However, they need not be actual raw disk partitions. According to the present invention, an alternative approach is to create sparse files 355 on a regular ext4 formatted filesystem. These files can then be made available as if they were disk devices by exposing them as loop devices. For instance, these loop devices can be presented to the operating system as /dev/loop0, /dev/loop1, /dev/loop2, etc., and for all intents and purposes can be used in exactly the same way as true raw disk partitions.

In particular, the mdadm utility can be used to create a software-based array of disks. This array can be then configured with a desired replication policy, e.g., RAID 0, RAID 1, RAID 5, etc. However, to provide resilience against the failure of individual underlying disk devices and the associated filesystem, RAID10 (stripe and mirror everything) may be preferred since it can provide the performance of RAID 0 combined with the fault tolerance of RAID1. This virtual RAID 10 array can then be formatted as a regular filesystem (e.g., ext3, ext4, or XFS) and made available for the creation of temporary tablespaces.

By way of further illustration, the following is a simple example of the main commands required to create a virtual array comprising four block devices 355:

```
cd /disk1/bigsql
dd of=virtdisk1 bs=1024 count=0 seek=100K
cd /disk2/bigsql
dd of=virtdisk2 bs=1024 count=0 seek=100K
... repeat for disk3, disk4
sudo losetup -f /disk1/bigsql/virtdisk1
sudo losetup -f /disk2/bigsql/virtdisk2
sudo losetup -f /disk3/bigsql/virtdisk3
sudo losetup -f /disk4/bigsql/virtdisk4
sudo mdadm --create /dev/md0 --level=10
--raid-devices=4 /dev/loop{0,1,2,3}
mount /dev/md0 /mnt/bigsql
```

A consideration may be the choice of the sparse file/loop block device 355 size on each disk drive 340.

One constraint/requirement may be that the devices 355 are sufficiently large enough to provide for the temporary tablespace needs to spill all operations for an entire concurrent workload at peak processing times. Another constraint/requirement may, however, be that device 355 is essentially a fixed size and the allocated space is no longer available for other workloads. This is one advantage that the conventional placement of the (non-resilient) temporary tables directly on the JBOD ext4 formatted disks can offers, namely that storage needs are elastic and consume only what is needed at that point in time to satisfy the temporary spilling needs of the workload in progress.

However, file systems may allow the creation of more than one system temporary tablespace. Thus, some embodiments propose to retain the conventional/existing (non-resilient) temporary tablespace in addition to allocating a portion of each disk drive for the proposed (resilient) virtual temporary tablespace.

Figure 4:
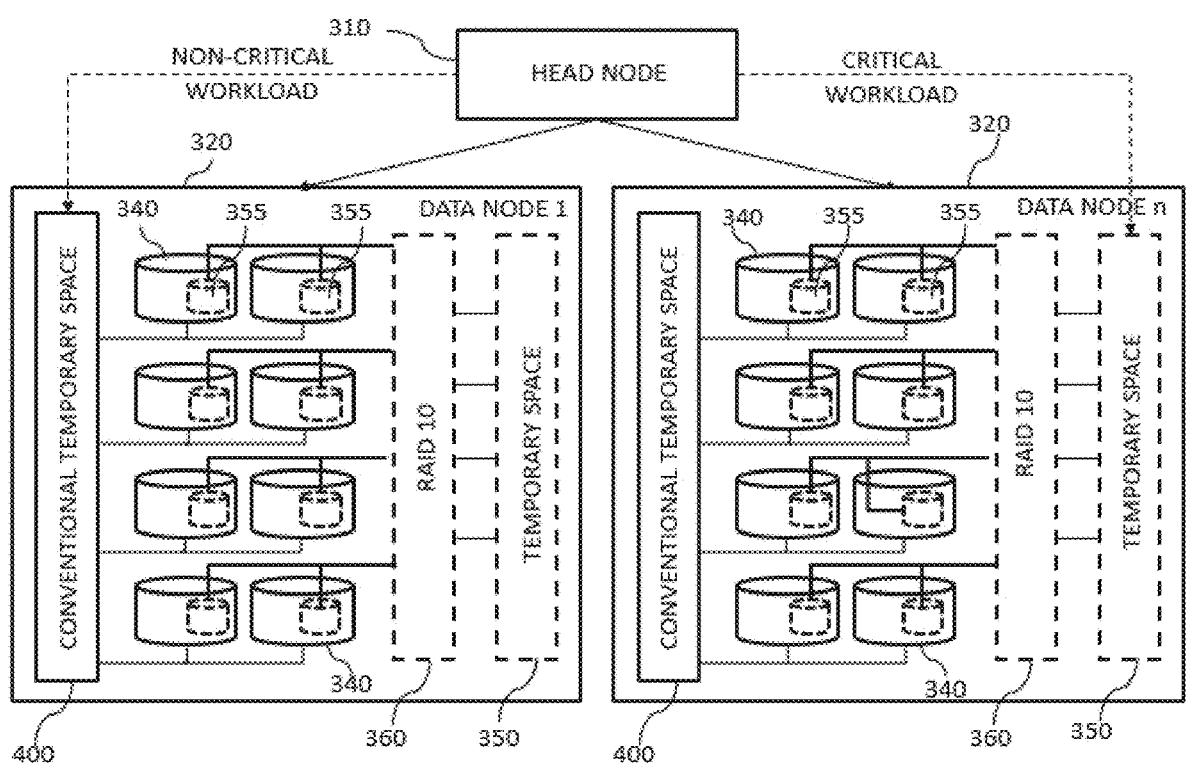
FIG. 4 shows a modified version of the system of FIG. 3, wherein a portion of each disk drive is allocated for resilient temporary tablespace for critical workload whilst also employing the existing/conventional non-resilient temporary tablespace for non-critical workload, in accordance with an embodiment of the present invention.

FIG. 4 shows a modified version of the system of FIG. 3, wherein a portion of each disk drive 340 is allocated for resilient temporary tablespace (i.e., virtual storage for temporary data storage according to an embodiment) whilst also comprising the existing/conventional non-resilient temporary tablespace 400.

Using a workload manager, queries may be allocated to either the conventional temporary storage space 400 or the proposed virtual (resilient) temporary storage space 350. For example, the workload manager may, amongst other things, employ thresholds on tablespace storage usage and automatically trigger actions in response to breaches of these thresholds. For instance, if a usage threshold value is exceeded, it can trigger a new action to divert any subsequent queries to the conventional (non-resilient) temporary storage space 400. Additionally, when the usage of the virtual (resilient) temporary storage space 350 then falls back below the threshold, any subsequent queries can then be sent to virtual (resilient) temporary storage space 350. Further, the workload manager may be configured to record the events that breached the threshold(s), and capture detailed information regarding the queries including the storage used, etc. Using this information, an administrator may adapt the size of virtual disk drives 355 to minimize or eradicate spills to the non-resilient temporary storage space 400.

In other embodiments, the workload manager may be configured to give important workloads (e.g., users with critical workload queries) priority access to the virtual (resilient) temporary storage space 350, whereas less important workloads (e.g., users running less critical workload queries) are allocated to the conventional (non-resilient) temporary storage space 400. Such a concept is depicted by the dashed arrows in FIG. 4.

Further to the concepts described above, embodiments may also provide for re-configuring disk allocation to the resilient tablespace.

Although software RAID systems (such as mdadm) offer the capability to add new disk devices into existing arrays and rebalance the array, this can take a significant amount of time for the array rebalance operation to complete. However, it has been realised that the ephemeral nature of temporary tablespaces may be further exploited. In particular, temporary tablespace containers can be recreated upon system restart if they do not exist. Similarly, the command to drop and subsequently recreate the sparse files, the associated loop devices, and the virtual disk array typically only requires a few seconds to complete. Leveraging this understanding, embodiments may be configured to recreate the arrays from scratch on all hosts, so as to adjust the size of the virtual (resilient) temporary storage space. Additionally, when a disk failure does occur, an administrative action may be provided to automate the orderly replacement of the failed disk in the array.

Commands and associated logic for setting up and resizing the resilient temporary tablespace and replacing disks can be built-in to the existing SQL administration interface. This may require two or three custom actions, together with new user interface properties to enable/disable virtual (resilient) temporary storage space, and to specify the percentage disk allocation to the temporary storage. In this way, embodiments alleviate the need for a user to require a detailed understanding of the underlying storage and replication technologies.

Figure 5:
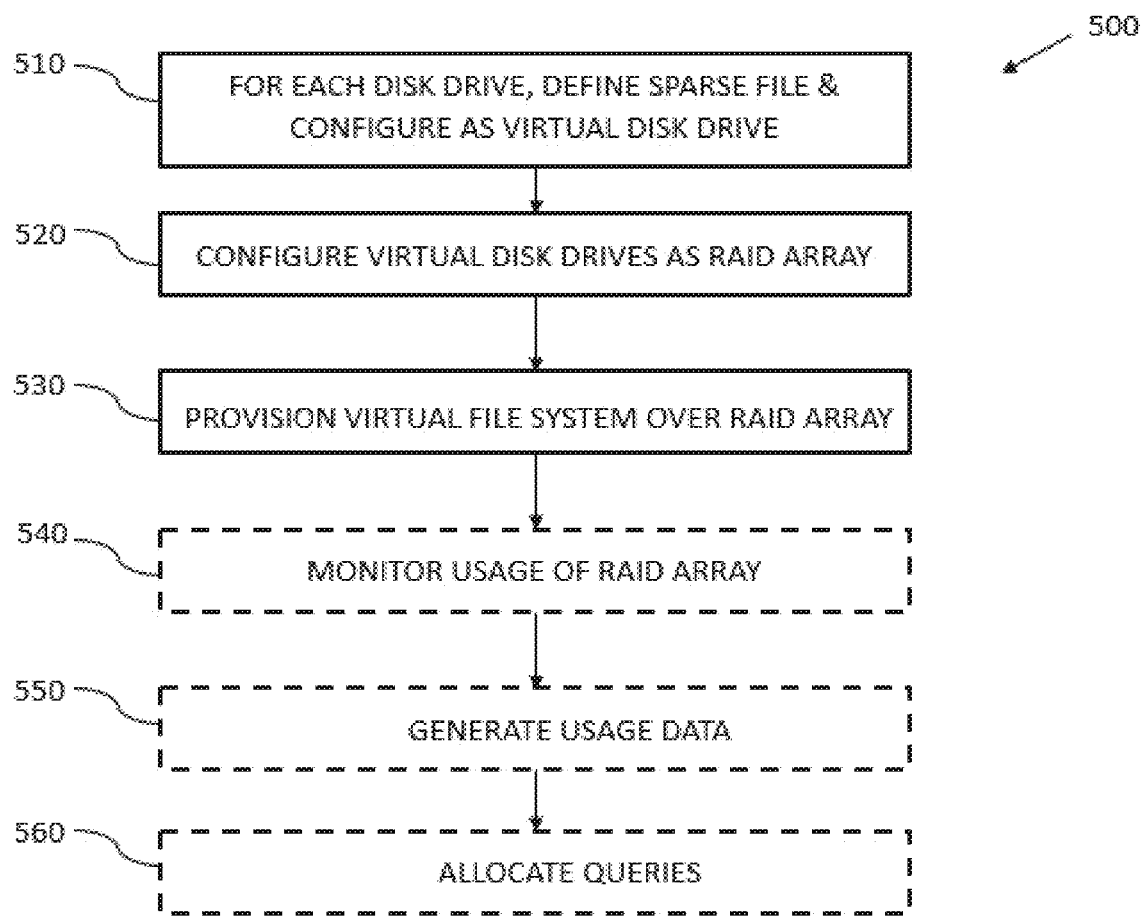
FIG. 5 depicts a flow diagram of an embodiment of a computer-implemented method for providing virtual storage for temporary data storage in a data node of a distributed file system, in accordance with an embodiment of the present invention.

Referring now to FIG. 5, FIG. 5 depicts a flow diagram of an embodiment of a computer-implemented method 500 for providing virtual storage for temporary data storage in a data node of a distributed file system. Each data node comprises a plurality of formatted disk drives.

In step 510, for each of the plurality of formatted disk drives of the data node, a sparse file of a predetermined size is defined and configured as a virtual disk drive. In this way, a portion of each disk drive of the data node is allocated to provisioning a virtual disk drive.

In step 520, the virtual disk drives are configured as a RAID array. By way of example, this can be done using a conventional software-managed storage utility (such as the LINUX® mdadm utility).

In step 530, a virtual file system is provisioned over the RAID array for storing temporary data of the data node. The virtual file system provides a lightweight fault tolerant virtual storage layer in the data node of the distributed file system. Such a virtual storage layer may, for example, provide resilience for the temporary data needs of a MPP SQL on Hadoop engine.

In the method of FIG. 5, additional steps 540, 550, and 560 may be provided for provisioning usage data relating to usage of the virtual file system. More specifically, step 540 comprises monitoring usage of the RAID array, step 550 comprises generating usage data based on the monitoring results, and step 560 comprises using the workload manager and generated usage data to allocate queries to either conventional temporary storage space or to the virtual temporary storage space as required.

Such usage data may, for example, be leveraged to manage and/or allocate queries to the data node. For instance, based on monitored usage of the RAID array (as indicated by the generated usage data), low-priority consumers may be directed/diverted to a conventional fault intolerant (but elastic) tablespace. Also, monitoring information may be used to modify the size of a (fault tolerant) tablespace of the virtual storage.

Figure 6:
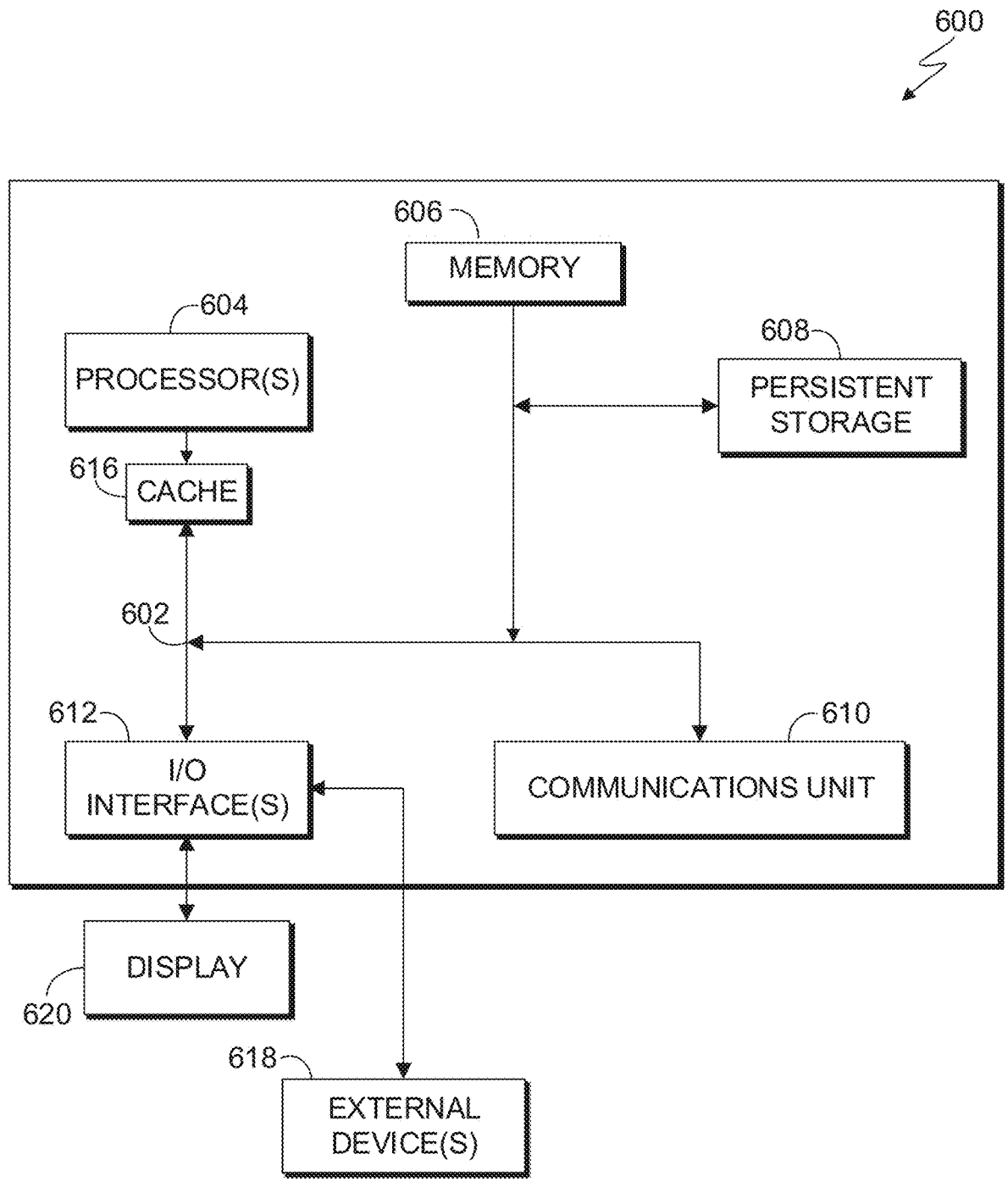
FIG. 6 depicts a block diagram of components of a computing system of the example distributed environment of FIG. 1, in accordance with an embodiment of the present invention.

FIG. 6 depicts a block diagram of components of a computing system of the example distributed environment of FIG. 1, in accordance with an embodiment of the present invention. For instance, a data node may be implemented in the computer system 600 (e.g., as a processor 604). It should be appreciated that FIG. 6 provides only an illustration of one implementation and does not imply any limitations with regard to the environments in which different embodiments can be implemented. Many modifications to the depicted environment can be made.

Computing system 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs may be downloaded to persistent storage 608 through communications unit 610.

I/O interface(s) 612 allows for input and output of data with other devices that may be connected to computing device 600. For example, I/O interface 612 may provide a connection to external devices 618 such as a keyboard, a keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Programs described herein are identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    for each of a plurality of formatted disk drives of a data node of an existing Hadoop distributed file system (HDFS), defining a sparse file of a predetermined size;
    for each of the plurality of formatted disk drives of the data node, configuring the sparse file as a virtual disk drive;
    for each of the plurality of formatted disk drives of the data node, configuring the virtual disk drive as a Redundant Array of Independent Disks (RAID) array; and
    provisioning a fault tolerant virtual file system over the RAID array for storing temporary data of the data node, wherein the temporary data of the data node comprises a temporary tablespace; monitoring usage of the virtual file system; generating usage data based on the monitored usage; and modifying a size of the virtual file system based on the usage data.

2. The computer-implemented method of claim 1, wherein the predetermined size is a fixed value and equivalent for each of the plurality of formatted disk drives of the data node.

3. The computer-implemented method of claim 1, wherein configuring the sparse file as the virtual disk drive comprises exposing the sparse file as a loop device.

4. The computer-implemented method of claim 1, wherein configuring the virtual disk drive as a RAID array comprises employing a software managed storage utility.

5. The computer-implemented method of claim 1, wherein the distributed file system comprises a plurality of data nodes each comprising a respective plurality of formatted disk drives.

6. The computer-implemented method of claim 5, further comprising:
    for each of the plurality of data nodes, providing a temporary storage space striped across the plurality of formatted disk drives of the data node; and
    controlling allocation of queries to either the temporary storage space or virtual file system of a respective data node of the plurality of data nodes.

7. A computer program product comprising a computer readable storage medium having program instructions embodied therewith, the program instructions executable by a processing unit to cause the processing unit to perform a method comprising:
    for each of a plurality of formatted disk drives of a data node of an existing Hadoop distributed file system (HDFS), defining a sparse file of a predetermined size;
    for each of the plurality of formatted disk drives of the data node, configuring the sparse file as a virtual disk drive;
    for each of the plurality of formatted disk drives of the data node, configuring the virtual disk drive as a Redundant Array of Independent Disks (RAID) array; and
    provisioning a fault tolerant virtual file system over the RAID array for storing temporary data of the data node, wherein the temporary data of the data node comprises a temporary tablespace; monitoring usage of the virtual file system; generating usage data based on the monitored usage; and modifying a size of the virtual file system based on the usage data.

8. The computer program product of claim 7, wherein the predetermined size is a fixed value and equivalent for each of the plurality of formatted disk drives of the data node.

9. The computer program product of claim 7, wherein configuring the sparse file as the virtual disk drive comprises exposing the sparse file as a loop device.

10. The computer program product of claim 7, wherein configuring the virtual disk drive as a RAID array comprises employing a software managed storage utility.

11. A computer system for providing virtual storage for temporary data storage in a data node of a distributed file system, the data node comprising a plurality of formatted disk drives, the computer system comprising:
    one or more computer processors;
    one or more computer readable storage media;
    program instructions collectively stored on the one or more computer readable storage media for execution by at least one of the one or more computer processors, the program instructions executable by a processing unit to cause the processing unit to perform a method comprising:
        for each of a plurality of formatted disk drives of a data node of an existing Hadoop distributed file system (HDFS), defining a sparse file of a predetermined size;
        for each of the plurality of formatted disk drives of the data node, configuring the sparse file as a virtual disk drive;
        for each of the plurality of formatted disk drives of the data node, configuring the virtual disk drive as a Redundant Array of Independent Disks (RAID) array; and
        provisioning a fault tolerant virtual file system over the RAID array for storing temporary data of the data node, wherein the temporary data of the data node comprises a temporary tablespace; monitoring usage of the virtual file system; generating usage data based on the monitored usage; and modifying a size of the virtual file system based on the usage data.

12. The computer system of claim 11, wherein the predetermined size is a fixed value and equivalent for each of the plurality of formatted disk drives of the data node.

13. The computer system of claim 11, wherein configuring the sparse file as the virtual disk drive comprises exposing the sparse file as a loop device.

14. The computer system of claim 11, wherein configuring the virtual disk drive as a RAID array comprises employing a software managed storage utility.

\* \* \* \* \*